United States Patent [19]

Nishikaji et al.

[11] 4,074,041

[45] Feb. 14, 1978

[54] PROCESS FOR PREPARING SOLID WATER SOLUBLE POLYMERS

[75] Inventors: Takashi Nishikaji; Kenzo Watanabe, both of Sagamihara; Shigeru Sawayama, Machida, all of Japan

[73] Assignees: Mitsubishi Chemical Industries Limited; Kyoritsu Yuki Co., Ltd., both of Tokyo, Japan

[21] Appl. No.: 717,742

[22] Filed: Aug. 25, 1976

[51] Int. Cl.² ............................................... C08F 6/12
[52] U.S. Cl. ........................... 528/488; 260/29.6 PT; 526/303; 526/312
[58] Field of Search ........................ 528/488; 526/312; 260/29.6 PT

[56] References Cited

U.S. PATENT DOCUMENTS

| | | | |
|---|---|---|---|
| 3,486,932 | 12/1969 | Schaper et al. | 117/201 |
| 3,661,880 | 5/1972 | Markert et al. | 260/89.5 N |

*Primary Examiner*—Stanford M. Levin
*Attorney, Agent, or Firm*—Oblon, Fisher, Spivak, McClelland & Maier

[57] ABSTRACT

An aqueous gel of a water-soluble polymer containing units of a quaternary ammonium salt of an alkylacrylate or a methacrylate is dehydrated by adding at least one salt of a divalent metal and a strong acid to said gel and then dehydrating said gel.

9 Claims, No Drawings

PROCESS FOR PREPARING SOLID WATER SOLUBLE POLYMERS

BACKGROUND OF THE INVENTION

1. Field of the Invention

The present invention relates to an improved process for preparing powdery water soluble polymers containing a quaternary ammonium salt of an aminoalkylacrylate or an aminoalkylmethacrylate (produced by reacting an alkylhalide or an aralkylhalide).

2. Description of the Prior Art

The homopolymers of a quaternary ammonium salt of an aminoalkylacrylate or methacrylate and copolymers of a quaternary ammonium salt of an aminoalkylacrylate or methacrylate and a vinyl monomer such as acrylamide, or methacrylamide are known as water soluble cationic polymers which are useful as coagulants, soil conditioners, drainages, retention aids, fillers and sizing agents in paper manufacture.

These polymers have been commercialized and are used in the form of aqueous solutions. However, the properties of aqueous solutions of the polymer deteriorate upon long storage and the aqueous solutions are inconvenient when transported or stored.

Because of the disadvantages of aqueous polymer solutions there has been a tendency to commercialize water soluble polymers and powder or granular material.

Powdery water soluble polymers containing units of a quaternary ammonium salt of an aminoalkylacrylate or an aminomethacrylate can be prepared by the aqueous solution polymerization or emulsion polymerization in an aqueous solution of a quaternary ammonium salt produced by quaternizing an aminoalkylacrylate or an aminoalkylmethacrylate with an alkylhalide or an aralkylhalide. Alternatively, an aqueous solution of the quaternary ammonium salt and a vinyl monomer such as acrylamide or methacrylamide can be copolymerized in the presence of a polymerization initiator. If necessary, the resulting hydrated polymer can be crushed or dehydrated by extraction in an organic medium. Or the hydrated polymer can be azeotropically distilled in an organic medium-water system, heat dried or the like.

The water soluble polymers are tacky in aqueous solutions or in jellies whereby they have a tendency to adhere in the state of mass when dehydrating the powdery or granular jelly polymers prepared by wet crushing or emulsion polymerization. Thus, dehydration of the polymer is usually difficult.

SUMMARY OF THE INVENTION

It is an object of the present invention to provide a process for preparing powdered water soluble polymer by dehydration without the problem of the polymer powder adhering together. This object of the invention can be attained by adding a divalent metal salt of strong acid to an aqueous solution or jelly of a water soluble polymer containing units of a quaternary ammonium salt of an alkylacrylate or an methacrylate having formula

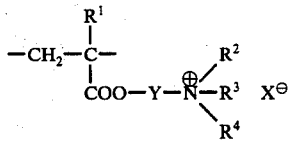

wherein $R^1$ represents hydrogen or methyl;
$R^2$, $R^3$ and $R^4$ represent lower alkyl, or aralkyl;
Y represents alkylene or a hydroxy substituted alkylene group having 2 to 4 carbon atoms; and
X represents halogen, during the dehydration of the polymer.

DETAILED DESCRIPTION OF THE PREFERRED EMBODIMENTS

The water soluble polymers of the present invention contain units of a quaternary ammonium salt of an alkylacrylate or methacrylate of formula (I), can be produced by reacting an aminoalkylacrylate or amino methacrylate with an alkylhalide or an aralkylhalide.

Suitable aminoalkylacrylates and amino methacrylates include dimethylaminoethylacrylate, diethylaminoethylacrylate, dimethylamino-2-hydroxypropylacrylate, diethylamino-2-hydroxypropylacrylate, di(n-butyl)aminoethylacrylate and the corresponding amino methacrylates and the like.

Suitable alkylhalides and aralkylhalides used in the quaternarization reaction include methylchloride, ethylchloride, methylbromide, ethylbromide, propylbromide, methyliodide, ethyliodide, butyliodide, benzylchloride, benzylbromide and the like. The quaternary ammonium salt is homopolymerized or copolymerized with a comonomer such as acrylamide, methacrylamide, N,N-dimethylacrylamide, acrylonitrile, methacrylate, methyl methacrylate or the like to produce an aqueous solution or jelly of the water soluble polymer. The polymerization can be conducted by any conventional method of polymerizing the monomers in an aqueous medium such as aqueous solution polymerization or emulsion polymerization. In aqueous solution polymerization technique, an aqueous solution of the monomers having a concentration less than 70% preferably 10 - 60% is admixed with 0.001 - 2 wt.% of a radical initiator based on the monomers and the mixture is heated to a temperature of 40° - 80° C. Suitable radical initiators include peroxides such as potassium peroxide, ammonium peroxide, hydrogen peroxide, benzoyl peroxide and azo type radical initiators such as azobisisobutyronitrile, 2,2'-azobis (2-amidinopropane)dihydrochloride and the like.

It is also possible to use a redox type initiator such as combinations of a metal salt, e.g., sodium sulfite, or sodium thiosulfate or a tertiary amine, e.g., triethanolamine, or N,N-dimethylaniline with a peroxide.

With the redox type initiator, it is possible to polymerize the monomer at relatively low temperatures.

In emulsion polymerization, an aqueous solution of a monomer having a concentration less than 70% preferably 20 - 60% is emulsified in an organic medium which includes chlorinated hydrocarbons such as dichloroethane, trichloroethylene; aliphatic or alicyclic hydrocarbons such as hexane, cyclohexane, and aromatic hydrocarbons such as benzene, xylene and the like, and the emulsion is heated in the presence of an initiator such as one of those mentioned above for aqueous solution polymerization. The weight ratio of the organic medium to the aqueous solution of the monomer is usually in the range of 1 – 3. Suitable emulsifiers which can be used in the emulsion polymerization include nonionic emulsifiers such as polyoxyethylenealkyl ethers, polyoxyethylenealkylphenol ethers, polyoxyethylenealkyl esters, sorbitanealkyl esters, and the like, etc.; and conventional cationic emulsifiers.

In accordance the polymerization reaction, the water soluble polymers can be produced in an aqueous solution or a jelly form having a high viscosity, wherein the product having a greater than 70 wt.% water content is referred as an aqueous solution and the product having less than 70 wt.% water content is referred to as a jelly.

The aqueous solution or jelly of the water soluble polymers can be dehydrated by the solvent dehydration method, the azeotropic distillation method and the heat drying method.

The essential feature of the process of the invention involves the addition of a divalent metal salt of a strong acid to the polymer for the dehydration step.

Suitable salts of the invention include the chloride and sulfate salts of calcium, magnesium and barium such as calcium chloride, calcium sulfate, magnesium chloride, barium chloride, barium sulfate and the like. It is possible to use hydrated salts which contain water in the crystals such as calcium chloride dihydrate, calcium sulfate hemihydrate, calcium sulfate dihydrate, magnesium chloride hexahydrate and the like.

The divalent metal salt of a strong acid is added in amounts of 2 – 50 wt.% preferably 5 – 20 wt.% based on the water soluble polymer in the last stage of the polymerization, after the polymerization or upon dehydration. The salt can be added in the form of a powder, aqueous solution or a slurry. In the heat drying of the polymer, an aqueous solution or jelly of the water soluble polymer which is admixed with the divalent metal salt of a strong acid, is dehydrated by heating at 60° – 150° C under atmospheric pressure or reduced pressure. Preferably, a drum dryer is used. If the polymer is dried by the azeotropic distillation method, an organic medium which forms an azeotrope with water and which does not dissolve the water soluble polymer such as benzene, toluene, xylene, cyclohexane, hexane, carbon tetrachloride, dichloroethane, trichloroethane or the like, preferably benzene, cyclohexane or hexane is normally used. The aqueous solution or jelly of the water soluble polymer which is admixed with the divalent metal salt of a strong acid is dehydrated by azeotropic distillation in the organic medium.

Preferably, the amount of organic medium added in the distillation ranged from about 1 – 3 times the water content of the solution or jelly.

If the polymer is dried by the solvent dehydration method, the aqueous solution or jelly of the water soluble polymer which is admixed with the divalent metal salt a strong acid is dehydrated by contacting the solution or jelly with an organic solvent such as methanol, acetone, or the like, which extracts water from the water soluble polymer but does not dissolve the polymer.

The extraction is usually conducted two or more times with the organic solvent in amounts of 2 – 10 especially 3 – 6 times the water content of the solution or jelly.

In the dehydration, the water content of the aqueous solution or jelly of the water soluble polymer is usually reduced from 97 – 30%, especially 90 – 40% to 2 – 25%.

In order to improve the dehydration efficiency, it is necessary to increase specific surface area of the water soluble polymer. This can be accomplished by crushing the jelly of the water soluble polymer before or during the dehydration.

When the water soluble polymer is prepared by emulsion polymerization, it is possible to dehydrate the polymer by azeotropic distillation by using the organic reaction medium used in the emulsion polymerization as the organic medium. As a result of employing the process of the invention, the solid water soluble polymer does not coagulate to form a mass during dehydration and the rate of dehydration can be substantially improved. Consequently, deterioration of the properties of the water soluble polymer during dehydration can be prevented.

The Examples are provided for purpose of illustration of the invention only and are not intended to be limiting in any manner.

EXAMPLE 1

A 8.44 g amount of $\beta$-methacryloyloxyethyl trimethyl ammonium chloride and 11.76 g of acrylamide were dissolved in 69 g of water.

The aqueous solution was charged in a kneader and heated at 60° C in a nitrogen atmosphere.

Then, 1 g of 10% aqueous solution of potassium persulfate was added to said aqueous solution and the mixture was stirred at 60° C for 2 hours. The mixture was cooled to room temperature, and 4 g of anhydrous calcium chloride was added to the reaction mixture and the mixture was stirred for 1 hour. Then, 100 g of acetone was added and the mixture was stirred for 1 hour. The resulting jelly was remove from the kneader and was crushed and charged into a 1 liter beaker.

A 200 g amount of acetone was added with stirring. The acetone was separated by decantation and then 200 g of acetone was added again with stirring. The resulting granular polymer was filtered and dried under reduced pressure whereby a granular solid polymer having a water content of less than 20 wt.% was obtained.

On the other hand, when the prepared jelly polymer not containing anhydrous calcium chloride was crushed and was admixed with acetone, the polymer changed to a mass without forming a granular polymer product.

EXAMPLE 2

Into a 2 liter four-necked flask equipped with a thermometer, a nitrogen inlet pipe, a condenser and a stirrer made of Teflon (polyfluoroethylene), 55.6 g of $\beta$-methacryloyloxyethyl trimethyl ammonium chloride, 44.4 g of acrylamide, 197 g of water, 400 g of cyclohexane and 12 g of nonionic emulsifier were charged.

The mixture was stirred at 50° C under flowing nitrogen gas. A 3 g amount of a 10% aqueous solution of potassium persulfate was added to the mixture and the polymerization was conducted for 3 hours whereby a jelly of water soluble polymer having particle diameter of 0.1 – 1 mm was obtained. The jelly was cooled and admixed with 5 g of powdery calcium sulfate dihydrate and the mixture was stirred for 30 minutes.

A 400 g amount of acetone was added to the jelly and the mixture was further stirred for 30 minutes. The resulting mixture was charged into a 2 liter beaker and cyclohexane and acetone were separated by decantation. A 400 g amount of acetone was added again and the mixture was stirred for 30 minutes. The resulting product was filtered and dried under reduced pressure whereby a powdery water soluble polymer having a particle diameter of less than 0.5 mm was obtained.

On the other hand, when the polymer jelly containing particles of a diameter of 0.1 – 1 mm in cyclohexane was admixed with 400 g of acetone without the presence of calcium sulfate dihydrate and the mixture was stirred, the hydrated polymer particles coagulated to an extent to form particles of polymer having a diameter of more than 10 mm. The polymer also adhered to the stirrer and the walls of the four-necked flask, thus making stirring difficult.

EXAMPLE 3

A jelly of water soluble polymer wherein the polymer particles had a diameter of 0.1 – 1 mm in cyclohexane as prepared in Example 2 was admixed with 20 g of magnesium chloride and the mixture was stirred for 30 minutes. The four-necked flask equipped with a condenser which was used in the polymerization reaction was converted to an azeotropic distillation apparatus and water was separated by azeotropic distillation while stirring the resulting mixture at 95° – 100° C. The mixture was cooled to room temperature and the product was filtered and dried under reduced pressure whereby a powdery water soluble polymer of a particle size diameter less than 0.5 mm was obtained. On the other hand, when water was separated from the polymer jelly containing particles of a diameter of 0.1 – 1 mm in cyclohexane as prepared in Example 2 by azeotropic distillation, the polymer particles adhered to each other to form layer particles having a diameter of more than 10 mm. The polymer also adhered to the stirrer and the walls of the flask, thus making stirring difficult. Bumping also occurred, making the dehydration difficult.

EXAMPLES 4 – 5

The process of Example 2 was repeated except that 5 g of calcium sulfate hemihydrate or 20 g of barium chloride was added instead of calcium sulfate dihydrate, and the product was dehydrated to a water content of 20% and 25%, respectively. (The water content of the jelly was 66.7 wt.%).

There was no adhesion of the water-soluble polymer on the stirrer or the walls of the flask, and a powdery water soluble polymer of a particle size diameter less than 0.5 mm was obtained in each case.

EXAMPLES 6 – 7

A jelly polymer having a particle size diameter of 0.1 – 1 mm prepared by the polymerization reaction of Example 2 (water content of 66.7%) was admixed with each of the salts shown in Table 1 and the mixture was stirred for 30 minutes.

The four-necked flask equipped with a condenser which was used in the polymerization reaction was converted to an azeotropic distillation apparatus and water was separated by azeotropic distillation while stirring the resulting mixture at 95° – 100° C.

The mixture was cooled to room temperature and the product was filtered and dried under reduced pressure whereby a powdery water soluble polymer having the particle size shown in Table 1 was obtained in each case.

Table 1

| | Example 6 | Example 7 | Comparative Example |
|---|---|---|---|
| Salt | CaSO$_4$ . 2H$_2$O powder | CaSO$_4$ . 2H$_2$O 30% slurry | None |
| Amount of salt | 20 g | 67 g (20 g as solid) | |
| Water distilled by azeotropic distillation (ml) | | | |
| After 1 hr. | 50 | 60 | 40 |
| 2 hr. | 165 | 160 | 80 |
| 3 hr. | 195 | 240 | 125 |
| Particle diameter of powdery polymer | less than 0.5 mm | less than 0.5 mm | more than 10 mm |
| Water content after dehydration | 4% | 6% | 42% |

We claim:

1. In a method of dehydrating an aqueous solution or jelly of a water soluble polymer which contains units of a quaternary ammonium salt of an alkylacrylate or a methacrylate having the formula:

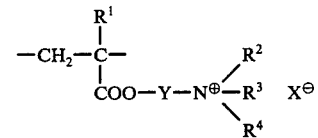

wherein R$^1$ represents hydrogen or methyl; R$^2$, R$^3$, and R$^4$ represent C$_1$–C$_4$ lower alkyl or aralkyl having 1 to 4 carbon atoms in the alkyl moiety;

Y is alkylene or hydroxy substituted alkylene having 2 to 4 carbon atoms; and

X is halogen;

wherein said quaternary ammonium salt has been homopolymerized or copolymerized with a comonomer; the improvement which comprises adding from 2 to 50 wt. parts to 100 wt. parts of said water soluble polymer of a strong acid salt of a divalent metal selected from the group consisting of calcium, magnesium and barium to said aqueous solution or jelly.

2. The process according to claim 1, wherein said dehydration is conducted by mixing a water miscible organic medium with said aqueous solution or jelly containing the divalent metal salt of a strong acid.

3. The process according to claim 1, wherein said dehydration is conducted by azeotropic distillation of said aqueous solution or jelly containing said divalent metal salt of a strong acid in an organic medium which forms an azeotrope with water, and does not dissolve said polymer.

4. The process of claim 1, wherein said dehydration is conducted by heat-drying said aqueous solution or jelly after the addition of said divalent metal salt.

5. The process of claim 1, wherein said divalent metal salt of a strong acid is selected from the group consisting of calcium, magnesium and barium salts of sulfuric acid and hydrochloric acid and hydrate salts thereof.

6. The process of claim 1, wherein said divalent metal salt of a strong acid is calcium sulfate or calcium chloride or a hydrate salt thereof.

7. The process of claim 1, wherein said divalent metal salt of a strong acid is calcium sulfate or a hydrate salt thereof.

8. The process of claim 1, wherein said aqueous solution or jelly of said polymer is prepared by polymerization of a monomer having the formula:

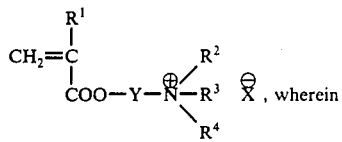

$R^1$-$R^4$, Y and X are as defined above, in an aqueous solution or an emulsion and said divalent salt of a strong acid is added to said aqueous solution or jelly and the resulting modified aqueous solution or jelly is dehydrated by azeotropic distillation with an organic medium.

9. The process according to claim 8, wherein said organic medium is benzene, toluene, xylene, cyclohexane, hexane, carbon tetrachloride, dichloroethane or trichloroethane.

* * * * *